United States Patent
Jun et al.

(10) Patent No.: US 9,774,538 B2
(45) Date of Patent: Sep. 26, 2017

(54) EFFICIENT PROCESSING OF RADIO RESOURCE REQUESTS

(75) Inventors: Jerry Jun, Austin, TX (US); Huitao Liu, Austin, TX (US); Darwin Parra, Pleasanton, CA (US); Yunpeng Li, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 249 days.

(21) Appl. No.: 13/184,093

(22) Filed: Jul. 15, 2011

(65) Prior Publication Data

US 2013/0017804 A1    Jan. 17, 2013

(51) Int. Cl.
*H04M 3/42* (2006.01)
*H04L 12/851* (2013.01)
*H04W 28/02* (2009.01)
*H04L 12/911* (2013.01)

(52) U.S. Cl.
CPC ......... *H04L 47/24* (2013.01); *H04W 28/0205* (2013.01); *H04L 47/70* (2013.01)

(58) Field of Classification Search
None
See application file for complete search history.

(56) References Cited

U.S. PATENT DOCUMENTS

| | | | |
|---|---|---|---|
| 6,084,866 A * | 7/2000 | Dorenbosch et al. | 370/331 |
| 8,589,541 B2 * | 11/2013 | Raleigh et al. | 709/224 |
| 2008/0014956 A1 * | 1/2008 | Balasubramanian | 455/452.1 |
| 2009/0119773 A1 * | 5/2009 | D'Amore et al. | 726/21 |
| 2009/0219915 A1 * | 9/2009 | Orcutt et al. | 370/347 |
| 2011/0019557 A1 * | 1/2011 | Hassan et al. | 370/252 |
| 2011/0055613 A1 * | 3/2011 | Mandyam | 713/340 |
| 2011/0199905 A1 * | 8/2011 | Pinheiro | H04W 4/005 370/235 |
| 2011/0202730 A1 * | 8/2011 | Sonoda et al. | 711/141 |

* cited by examiner

*Primary Examiner* — German J Viana Di Prisco
(74) *Attorney, Agent, or Firm* — Baker & Hostetler LLP

(57) ABSTRACT

A system for efficiently transmitting requests for data access from a wireless communications device to a radio access network. Requests for data access may be aggregated to more efficiently use radio resources. Aggregated requests may not be transmitted until a total number of requests or size of aggregated requests exceeds a threshold. Regardless of aggregation, requests may be stored until a timer expires, and then transmitted to the radio access network. Request priority, environmental data, and device data may be taken into account in determining when to transmit requests for data access.

18 Claims, 8 Drawing Sheets

EFFICIENT PROCESSING OF RADIO RESOURCE REQUESTS

TECHNICAL FIELD

The technical field generally relates to wireless communications and more specifically relates to processing radio resource requests.

BACKGROUND

The popularity of wireless communications devices continues to increase worldwide as such devices become more powerful and less expensive. Today, it is not uncommon for a single portable device to provide multiple services to a user, including voice calling, text messages, email, internet access, instant messaging, multimedia content presentation, visual voicemail, and nearly any other function that may at one time have been restricted to a desktop computer, a television, or a landline telephone. However, some aspects of wireless device technology have not adapted to the multiple functions and applications that are likely configured on a modern wireless communications device. Current devices use a "blind" data access scheme where data is requested from the network, via radio resources, without regard to the current conditions and status of the wireless device and components therein. The radio portion of current wireless devices is treated as a one-dimensional element by applications and other radio establishment causes that operate on such devices. An application or other radio establishment cause does not take into account the quality of service (QoS) requirements of other applications or radio establishment causes that may be executing on the device when requesting radio resources. Thus, requests for radio resources from various applications and radio establishment causes may interfere with each other and affect the quality of service provided by such applications and causes. What is needed in the art are systems and methods for more efficiently processing requests for radio network resources.

SUMMARY

Systems, methods, and devices are disclosed for obtaining device data at a data access module configured on a wireless communications device, receiving a request for data access, and determining that the request for data access is eligible to be serviced based on the device data. If the request for data access is eligible to be serviced, a determination may be made as to whether the request for data access is to be aggregated with other requests for data access. If so, the requests may be aggregated and transmitted to a radio access network. Request priority may also be taken into account and requests with higher priority may be transmitted before those with lower priority. Also, requests with higher priority may be transmitted under different device conditions than requests with lower priority.

Upon receiving a request for data access, a data access module may store the request. A timer may be started upon receipt of a first outstanding request, and after a configured period of time, some or all of the stored requests for data access may be transmitted. For aggregated requests, a threshold may be checked to determine if the stored requests for data access exceed a threshold based on the number of requests, the size of the requests when aggregated, the bandwidth that may be used for transmitting the aggregated requests, etc. These and other aspects of the present disclosure are described in more detail herein.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
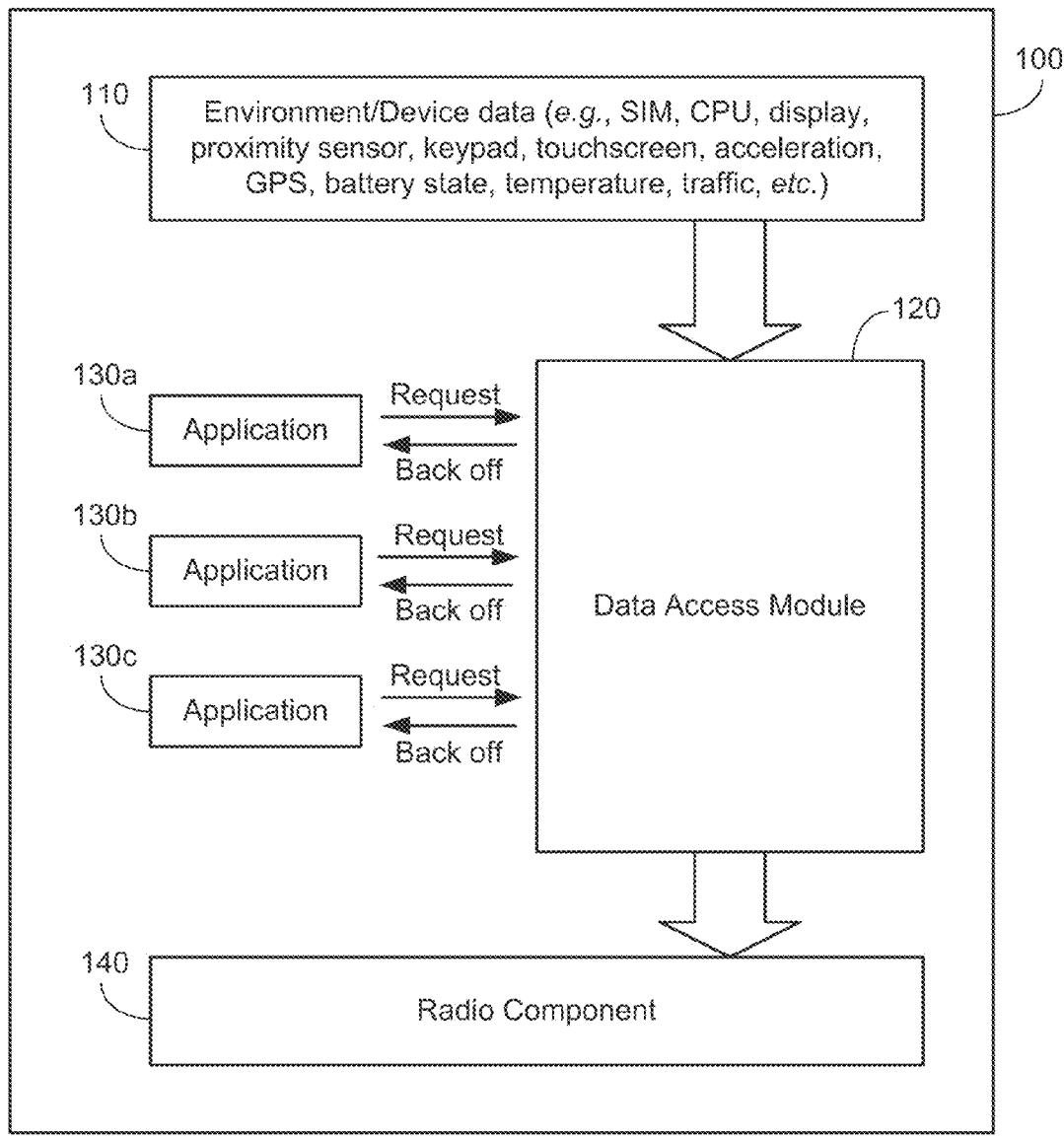
FIG. 1 is a block diagram of a non-limiting exemplary wireless communications device in which radio resource requests may be processed.

FIG. 1 illustrates exemplary wireless communications device 100. Wireless communications device 100 may any device as described herein (including the exemplary wireless device described in regard to FIG. 5) or any device capable of transmitting and/or receiving wireless communications of any type. Wireless communications device 100 may be configured with any type and number of components and modules. Such components and modules may include a processor, keypad, touchscreen, memory, display, display logic, audio generation components, speaker, microphone, global positioning system (GPS) components, other location determination component, proximity sensor, accelerometer, battery, etc. Such modules and components may be implemented in hardware, software, or a combination of both. Data from these components and modules may be generated and used in the present subject matter. In an embodiment, data from such components may be processed and other data may be generated and used in any embodiment described herein. Any type of data may be generated and/or used, including data that indicates the ambient conditions and/or environment within or outside of wireless communications device 100, the operating conditions and/or performance data of any of the various component of wireless communications device 100 (e.g., processor and memory utilization), the location and/or position of wireless communications device 100, etc. All such data may be referred to as data 110 of FIG. 1, and all such data is included herein where any such data is described as being used by a data access module in processing data access requests.

Applications 130*a-c* may be configured on and may execute on wireless communications device 100. Applications 130*a-c* may be any application that may be configured on a wireless communications device. Applications 130*a-c* may request data from devices with which wireless communications device 100 is capable of communicating, for example, via a wireless network or radio access network (RAN). Note that any RAN, wireless network, wireless communications network, etc., using any communications technology and/or protocols, may be referred to herein as a "wireless network." Communication with a wireless network may be performed on behalf of wireless communications device 100 by radio component 140, which may be any component or multiple components, implemented in hardware or software, that enable wireless communications between wireless communications device 100 and a wireless network or RAN. Components of radio component 140 may include antenna(s), transceiver(s), and any other wireless communication component, device, or module. All such embodiments are contemplated as within the scope of the present disclosure.

Wireless communications device 100 may be configured with data access module 120. Data access module 120 may be implemented in hardware, software, or a combination of both. Data access module 120 may receive requests from applications 130*a-c* for data stored or provided by devices accessible via a wireless network. Data access module 120 may forward such requests to radio component 140 or otherwise instruct radio component 140 to transmit communications requesting the data to a wireless network. Whereas in a prior art wireless device, applications such as applications 130*a-c* would directly interface with a radio component such as radio component 140 to request data from a wireless network, in an embodiment, data access module 120 may perform prioritization, grouping, and other tasks that may assist in more effectively using the radio resources available to wireless communications device 100.

Data access requests, such as those sent by applications 130*a-c*, may be any communication that requests data from a device outside of the wireless communications device in which the request was generated. Such requests may originate in any application, service, feature, etc. that may be configured on a wireless communications device, and all such applications, services, features, etc. are contemplated as within the scope of the present disclosure, and included whenever the terms "application" or "feature" are used herein. Such requests are often transmitted to a RAN in short burst of a few packets. Thus, by setting up a communications channel and/or other tying up communications resources to send such short bursts of packets, resources are not being efficiently used. This is because there may be a fixed amount of resources used to set up and tear down a communications channel between a wireless communications device and a RAN, regardless of the amount of traffic that is to be sent over such a channel. Moreover, setting up such channels may affect the bandwidth available to other, perhaps ongoing, services, such as operating a voice call on a wireless communications device. Thus, proper aggregation and timing of data access requests may make more efficient use of resources available to a wireless communications device In an embodiment, data access module 120 may use data 110 in determining how to handle data access requests from applications 130*a-c*. Data access module 120 may receive or obtain data 110 using any means or method. For example, the various devices and components that may generate data 110 may be configured to provide some or all of data 110 to data access module 120. Alternatively, or in addition, data access module 120 may request some or all of data 110 from such devices and components. In another alternative, data access module 120 may obtain some or all of data 110 indirectly or implicitly. Any combination or alternative means or methods for obtaining, receiving, or otherwise determining data 110 by data access module 120 are contemplated as within the scope of the present disclosure. Data access module 120 may store any or all of data 110 received or obtained over any period of time. For example, data access module 120 may store all data obtained over the most recent hour, day, week, etc. Alternatively, or in addition, data access module 120 may store data from certain components and not from others. Such stored data may be used by data access module 120 to determine how to service request of data access from applications 130*a-c*. For example, historical data may be used to determine a prioritization scheme for data access requests based on the current time, day, date, etc. and traffic patterns that have corresponded to the current time, day, date, etc.

Figure 2:
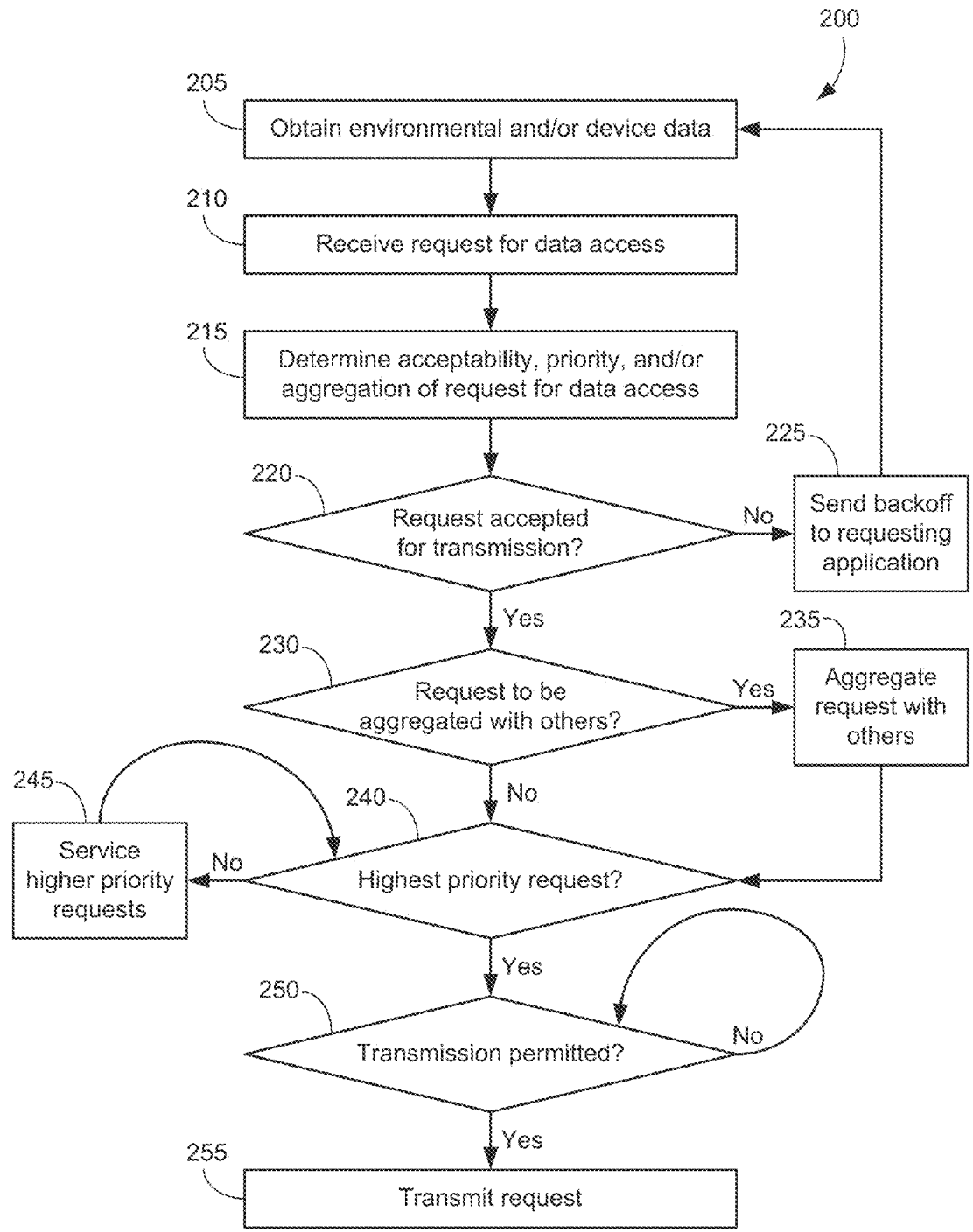
FIG. 2 illustrate a non-limiting exemplary method of implementing efficient processing of radio resource requests.

FIG. 2 illustrates exemplary method 200 of performing an embodiment of the present subject matter. Method 200 may be performed by a data access module configured in a wireless communications device, such as data access module 120 of FIG. 1. At block 205, a data access module may obtain environmental and/or device data. Such data may be provided proactively by other devices and components of the wireless communications device, requested from such devices and components by the data access module, or implicitly determined by the data access module. Any other method of obtaining such data is contemplated, as is continuous collection or obtaining of such data such that real-time or near-real-time data may be available to a data access module or other device, component, or module that may be configured to implement any aspect of the present disclosure. The data may be of any type, including the various types of data set forth herein.

At block 210, a data access module, or a similarly configured module, component, or device in a wireless communications device, may receive a request for access to data available via a network from an application running on a wireless communications device or a feature configured on a wireless communications device. The request may take any form, including forms known to those skilled in the art. However, instead of the request being provided directly to a radio resource or other radio access component of the wireless communications device, the request may be first processed by the data access module configured on the wireless communications device. As part of this processing, at block 215 the request may be analyzed by the data access module and a priority, acceptability status, and aggregation status may be determined for the request. In an embodiment, the data access module may determine that the request cannot be serviced at this time, or is ineligible for service for any reason. For example, if the data access module determines, in an embodiment based on the data received at block 205, that there is voice traffic currently being transmitted, received, and/or processed by the wireless communications device, and that any transmission of data may affect the voice traffic, the data access module may determine that the data request cannot be serviced. In an embodiment, the data access module may make such a determination based on data from a proximity sensor that indicates that the wireless communications device is currently being held up to the ear of a user. Alternatively, the data access module may determine that there is not enough bandwidth to service the request, or that the request would interfere with any other ongoing service or feature of the device, and therefore not accept the request. In such circumstances, or any other where the data access module may determine that the request cannot be serviced, the data access module may determine that the request cannot be serviced at block 220, and at block 225 may send a backoff instruction to the requesting application or feature at block 225.

Returning again to block 215, requests may be prioritized and may be aggregated to improve the quality of service provided to a user of the wireless communications device. For example, rather than establishing a RAN connection for each data access request, the data access module may aggregate such requests and thereby set up fewer RAN connections than otherwise might be used. In an embodiment, the data access module may be configured to wait to set up a RAN connection until a number of requests have been received, and/or until a time threshold has been reached since the most recent or oldest unserviced request was received. In another embodiment, requests may be prioritized using any criteria that may be available or configured. For example, some applications may be assigned higher priorities than others and may require faster servicing of data access requests, and therefore requests from such applications may be serviced before those from others that may be background applications or otherwise not require immediate data access request service. Any criteria for assigning priorities to requests and any means and methods of prioritizing requests are contemplated as within the scope of the present disclosure.

At block 220, as noted previously, a determination if made as to whether the request may be serviced. If not, at block 225, a backoff instruction may be sent to the requesting application or feature. If the request received at block 210 is accepted for servicing, at block 230, a determination may be made as to whether the request is to be aggregated with others. If so, at block 235, the request may be aggregated with other requests. In an embodiment, this may include holding the request and waiting for other requests to arrive that are then aggregated with the initial request. In an embodiment, priority may be used to aggregate requests. For example, high priority requests may be aggregated with other high priority requests, while lower priority requests may be aggregated only with other lower priority requests. Alternatively, all requests outstanding may be aggregated together. Any criteria for determining how to aggregate requests may be used and is contemplated as within the scope of the present disclosure.

At block 240, a determination may be made as to whether the received request, or the aggregated requests including the received request, is the highest priority request awaiting transmission to a RAN. If not, at block 245, other, higher priority, requests may be serviced, and the priority status of the received request may be checked again following servicing of the higher priority requests. When the received request, or the aggregated requests including the received request, is the highest priority request awaiting transmission to a RAN, at block 250 a determination may be made as to whether the transmission of the request (or aggregated requests) is permitted. Such transmission may not be permitted based on data received at block 205, for example, when proximity data indicates that a user is currently engaged in a voice call. Note that the conditions under which a request or aggregated request may be permitted to be transmitted may vary, in an embodiment, based on the priority of the requests or aggregated requests. For example, a high priority request or group of requests may be permitted to be transmitted during a voice call (determined from the data received at block 205, for example) while a low priority request or group of requests may not be permitted to be transmitted during a voice call. Any variety and combination of criteria and conditions for transmitting requests may be used, and all such embodiments are contemplated as within the scope of the present disclosure.

If transmission is not permitted, the request may be stored until transmission is permitted. Alternatively, the request may not be serviced at all, and a backoff instruction may be sent to the requesting application. When transmission is permitted, at block 255 the request may be transmitted to a RAN using any method or means, including the data access module sending the requests or an instruction to send the requests to a radio component of a wireless communications device.

Figures 3, 4:
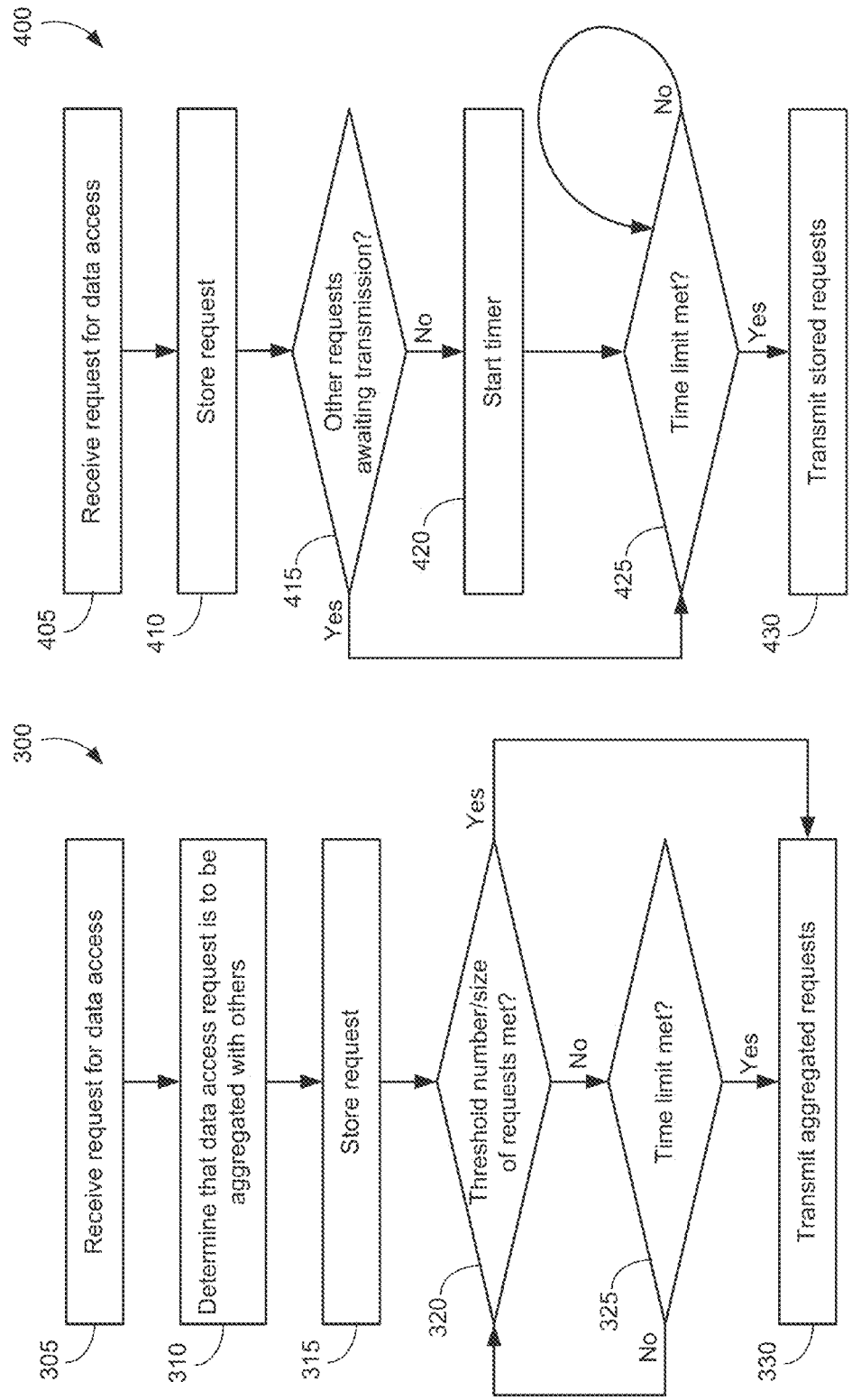
FIG. 3 illustrates another non-limiting exemplary method of implementing efficient processing of radio resource requests.
FIG. 4 illustrates another non-limiting exemplary method of implementing efficient processing of radio resource requests.

FIG. 3 illustrates exemplary method 300 of performing an embodiment of the present subject matter. Method 300 may be performed by a data access module configured in a wireless communications device, such as data access module 120 of FIG. 1. Method 300 provides an exemplary non-limiting means of aggregating and determining when to transmit data access requests. At block 305, a data access request may be received, for example by a data access module. At block 310, the data access module may determine that the request is to be aggregated with other data access requests. At block 315, the request may be stored for retrieval when it is determined to transmit the request.

In an embodiment, a set number of requests, or a set amount of data or bandwidth that may be used to service data access requests, may be configured at a data access module. For example, in the interest of more efficiently using uplink resources, a data access module may be configured to transmit data access requests to a RAN after receiving a certain number of requests. Alternatively, since requests may vary in the amount of traffic that such requests will generate (i.e., each request may require a varying number of packets to be generated and transmitted to a RAN), a data access module may maintain a running tally of the corresponding number of packets or bits, quantity of bandwidth, or any other measure of size of the total outstanding data access requests and/or resource utilization that may accompany a data access request. Once such a measurement reaches a configured threshold, the data access module may have the request transmitted. Thus, at block 320, a determination may be made as to whether such a threshold has been met. If so, the requests may be transmitted at block 330 using any method or means, including the data access module sending the requests or an instruction to send the requests to a radio component of a wireless communications device.

In order to prevent data access requests from not being transmitted in a timely fashion, a data access module may be configured to transmit data access requests awaiting aggregation before a threshold quantity of requests (or corresponding measure of resource usage) has been met. Such an embodiment may be used to ensure that applications don't repeatedly regenerate requests due to a lack of response detected by such applications. Thus, at block 325, a determination may be made as to whether a time limit has been met. The time since the arrival of the oldest stored request awaiting transmission may be compared to the configured time limit in making this determination. Alternatively, any other measure of time may be compared against the configured time limit. All such embodiments are contemplated as within the scope of the present disclosure. If the time limit has not been met, the method may return to block 320 to determine is a threshold number of requests (or corresponding measure of resource usage) has been met, and/or to block 325 for further determination of whether a time limit has been met. If the time limit has been met, at block 330 the aggregated requests may be transmitted.

FIG. 4 illustrates non-limiting exemplary method 400 of determining whether a time limit has been met. Note that method 400, as well as any other method, aspect, or embodiment described herein, may be used in conjunction with any other method, aspect, or embodiment described herein, or alone, and all such embodiments are contemplated as within the scope of the present disclosure. For example, transmission of data access requests may be made on a purely time dependent analysis, as shown in FIG. 4. Data access requests may be stored until a time threshold has been met and then all outstanding data access requests may be transmitted. Alternatively, a subset of all outstanding data access requests may be transmitted, for example a number of requests that use a set number of resources (e.g., requests equivalent to a set number of packets, resource blocks, bits, frames, etc.)

At block 405 a request for data access may be received. At block 410, the request may be stored. At block 415, a determination may be made as to whether other data access requests are already stored and awaiting transmission. If so, at block 425 a determination may be made as to whether a time limit has been met. If no other data access requests are already stored and awaiting transmission, at block 420, a timer may be started based on the arrival time of the data access request received at block 405. Note that alternative means of determining a time associated with a data access request may be used, such as recording the time of arrival of a data access request and then calculating the elapsed time since arrival as needed for comparison to a configured time limit. All such embodiments are contemplated as within the scope of the present disclosure.

At block 425, a determination is made as to whether a configured time limit has been met. If not, the determination may be repeated until the time limit is met. In some embodiments, for example that described in FIG. 3, other criteria may also trigger the transmission of stored/aggregated data access requests, such as meeting a threshold quantity of requests or resources required to service such requests. If, at block 425, it is determined that the time limit has been met, at block 430 the stored data requests may be transmitted to a RAN using any method or means, including the data access module sending the requests or an instruction to send the requests to a radio component of a wireless communications device. Note that all requests may be transmitted at block 430, or a subset of requests, in an embodiment selecting the oldest requests for transmission first, may be transmitted that may be a number of requests that use a set number of resources (e.g., requests equivalent to a set number of packets, resource blocks, bits, frames, etc.)

The methods and systems described above assist in efficiently processing radio resource requests and therefore making more efficient use of both wireless device and wireless network resources. By implementing the present disclosure, the user experience is improved. Set forth below are exemplary systems, devices, and components in which aspects of the present disclosure may be implemented.

Figure 5:
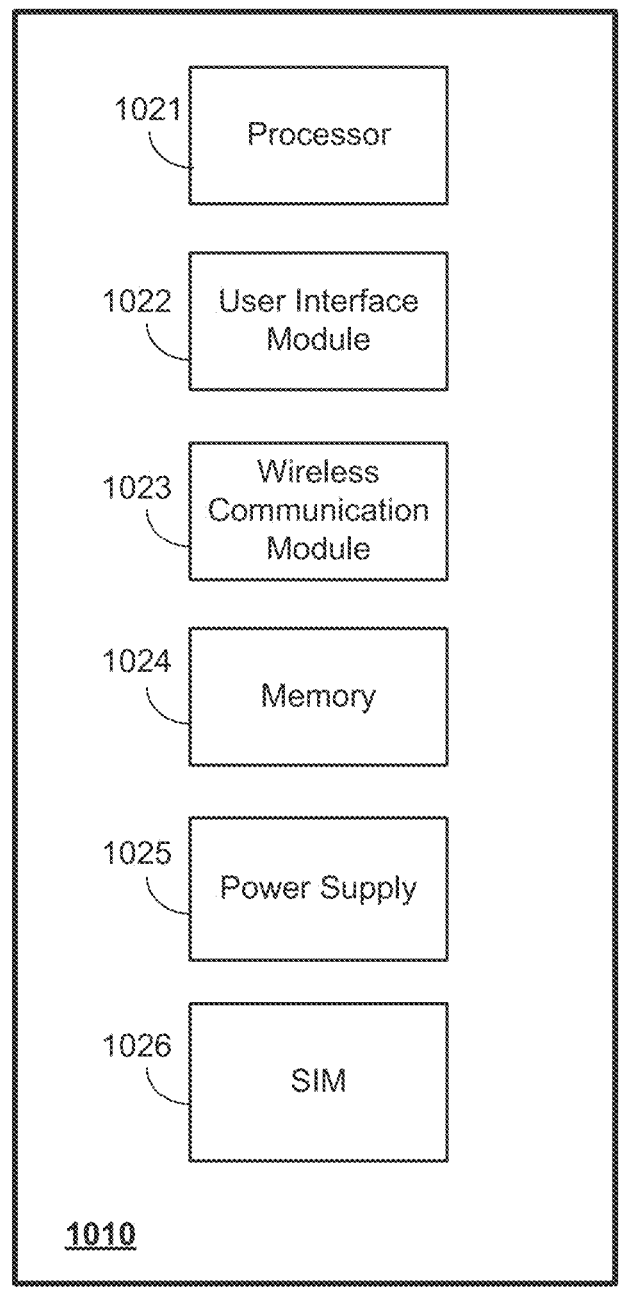
FIG. 5 is a block diagram of a non-limiting exemplary wireless device in which efficient processing of radio resource requests may be implemented.

FIG. 5 illustrates an example wireless device 1010 that may be used in connection with an embodiment. References will also be made to other figures of the present disclosure as appropriate. For example, wireless communications device 100 may be a wireless device of the type described in regard to FIG. 5, and may have some, all, or none of the components and modules described in regard to FIG. 5. It will be appreciated that the components and modules of wireless device 1010 illustrated in FIG. 5 are illustrative, and that any number and type of components and/or modules may be present in wireless device 1010. In addition, the functions performed by any or all of the components and modules illustrated in FIG. 5 may be performed by any number of physical components. Thus, it is possible that in some embodiments the functionality of more than one component and/or module illustrated in FIG. 5 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to efficient processing of radio resource requests, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as text communications content and associated data, multimedia content, software to efficiently process radio resource requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 6:
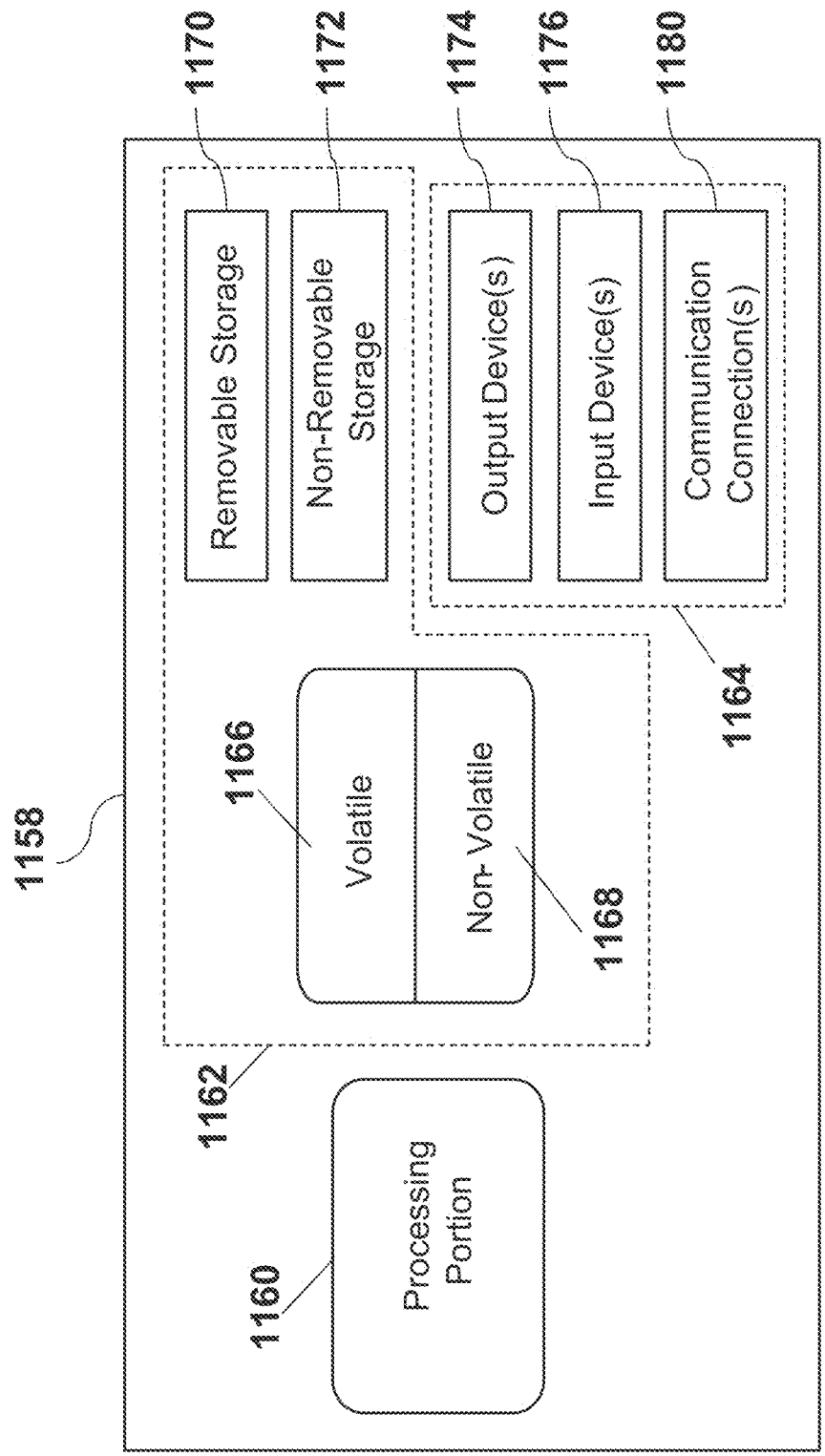
FIG. 6 is a block diagram of a non-limiting exemplary processor in which efficient processing of radio resource requests may be implemented.

FIG. 6 is a block diagram of an example processor 1158 which may be employed in any of the embodiments described herein, including as one or more components of wireless communications device 100, as one or more components of network equipment or related equipment, and/or as one or more components of any third party system or subsystem that may implement any portion of the subject matter described herein. It is emphasized that the block diagram depicted in FIG. 6 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 6, the processor 1158 comprises a processing portion 1160, a memory portion 1162, and an input/output portion 1164. The processing portion 1160, memory portion 1162, and input/output portion 1164 are coupled together (coupling not shown in FIG. 6) to allow communications between these portions. The input/output portion 1164 is capable of providing and/or receiving components, commands, and/or instructions, utilized to, for example, establish and terminate communications sessions, transmit and receive data access request data and responses, transmit, receive, store and process text, data, and voice communications, execute software that efficiently processes radio resource requests, receive and store radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing text, data, and/or voice communications, communications-related data and/or content, voice calls, other telephonic communications, etc. For example, the memory portion is capable of storing radio resource requests, software for an efficient radio resource request processing system, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how a dynamic text communication administration system may be implemented with stationary and non-stationary network structures and architectures in order to provide efficient processing of radio resource requests. It can be appreciated, however, that efficient processing of radio resource requests as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for efficient processing of radio resource requests may be applied independently of the method of data transport, and do not depend on any particular network architecture, or underlying protocols.

Figure 7:
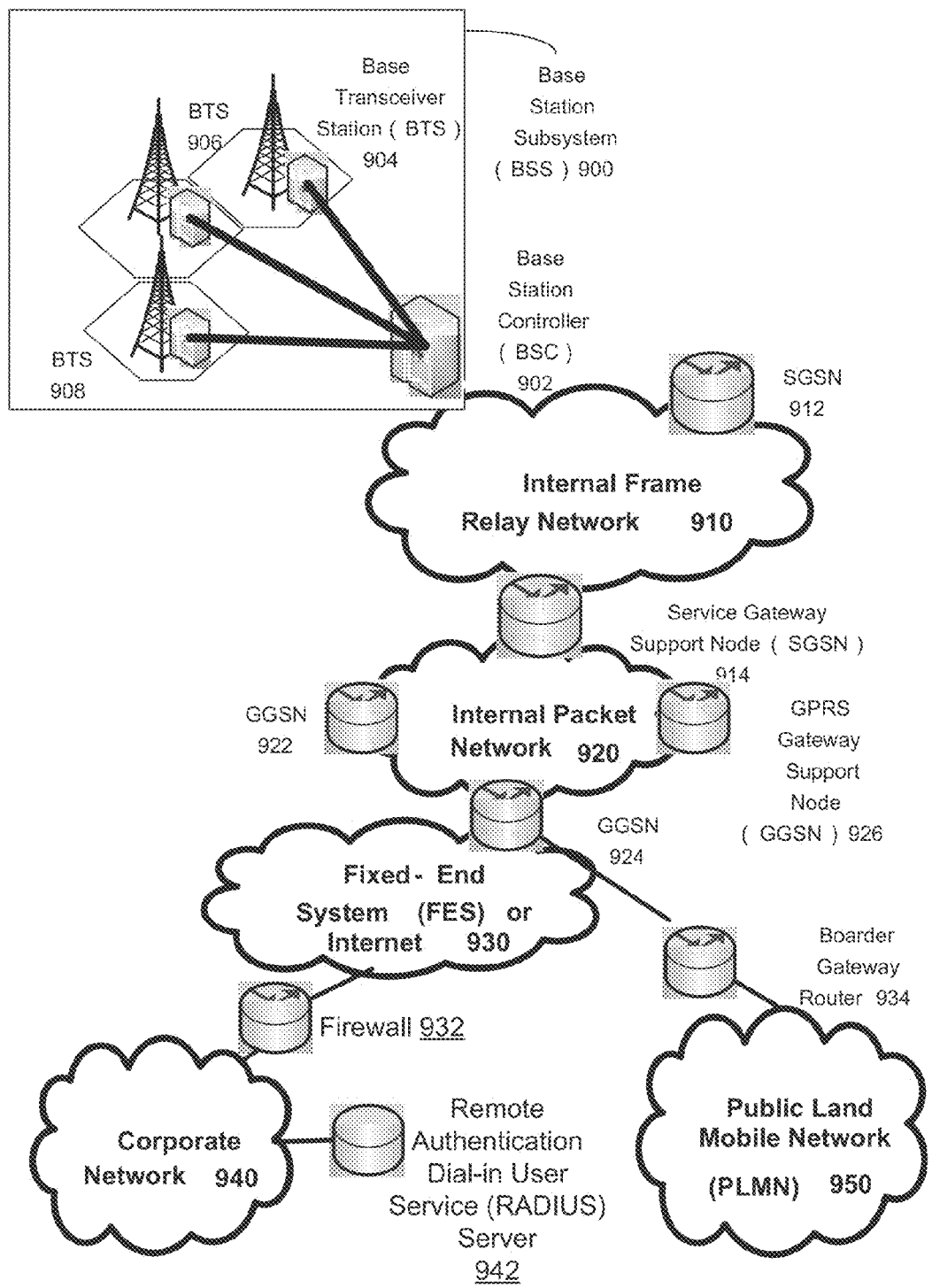
FIG. 7 is a block diagram of an non-limiting exemplary packet-based mobile cellular network environment, such as a GPRS network, in which efficient processing of radio resource requests may be implemented.

FIG. 7 depicts an overall block diagram of an exemplary packet-based mobile cellular network environment, such as a GPRS network, in which the systems and methods for efficient processing of radio resource requests such as those described herein may be practiced. In an example configuration, any RAN as described herein may be encompassed by or interact with the network environment depicted in FIG. 7. Similarly, wireless communications device 100 may communicate or interact with a network environment such as that depicted in FIG. 7. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless communications device 100) become connected to the wireless network. In exemplary fashion, the packet traffic originating from user devices (e.g., wireless communications device 100) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 8:
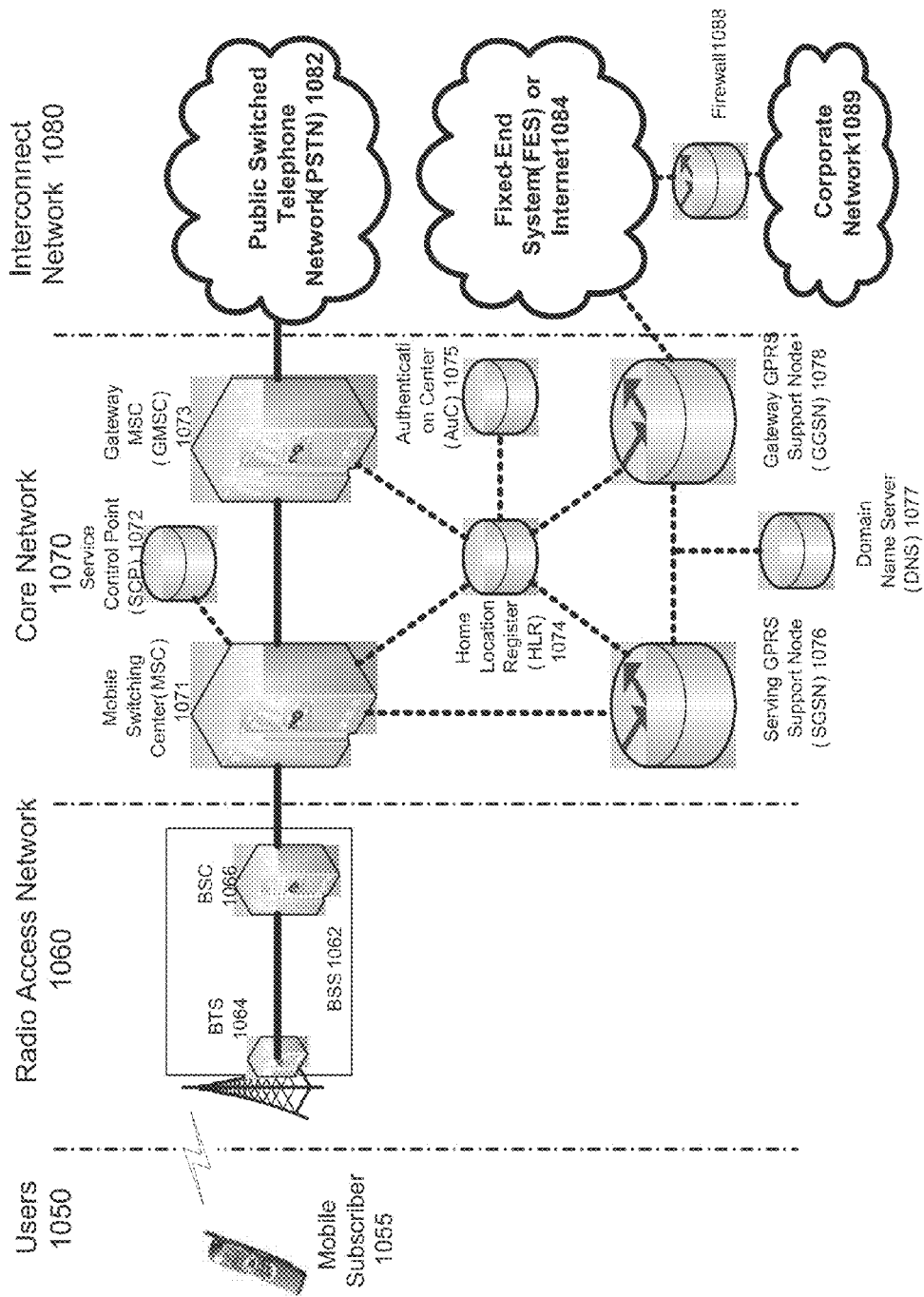
FIG. 8 illustrates a non-limiting exemplary architecture of a typical GPRS network, segmented into four groups, in which efficient processing of radio resource requests may be implemented.

FIG. 8 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 8). In an example embodiment, the device depicted as mobile subscriber 1055 may comprise wireless communications device 100. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 8, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless communications device 100, used by an end user of a mobile cellular service or a wireless provider. When a mobile subscriber turns on his or her mobile device, the mobile device may go through an attach process by which the mobile device attaches to an SGSN of the GPRS network. In FIG. 8, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of efficient radio resource request processing such as those described herein may include, but are not limited to, Gateway GPRS Support Node tables, Fixed End System router tables, firewall systems, VPN tunnels, and any number of other network elements as required by the particular digital network.

Figure 9:
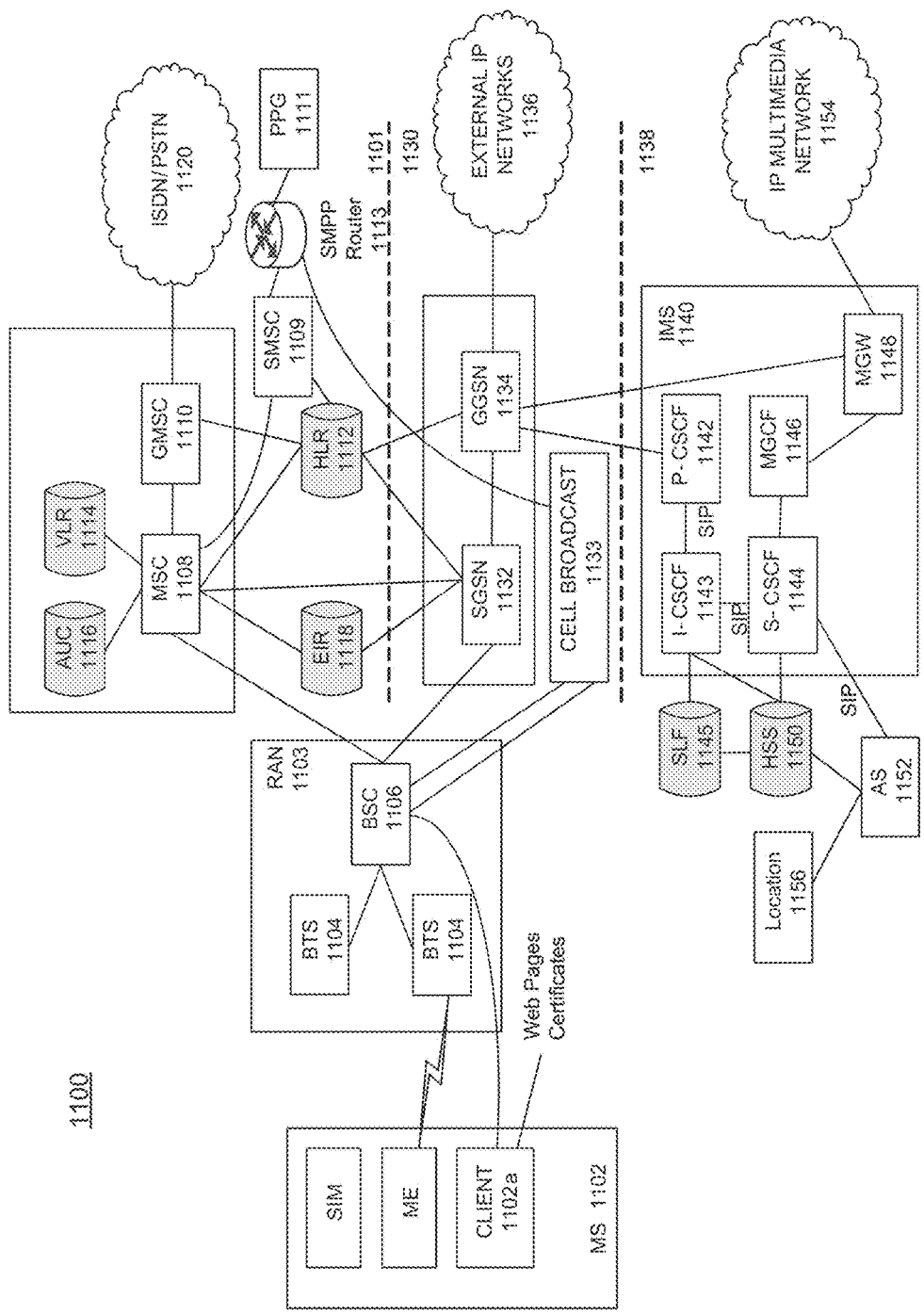
FIG. 9 illustrates a non-limiting alternate block diagram of an exemplary GSM/GPRS/IP multimedia network architecture in which efficient processing of radio resource requests may be implemented.

FIG. 9 illustrates another exemplary block diagram view of a GSM/GPRS/IP multimedia network architecture 1100 in which the systems and methods for efficient radio resource request processing such as those described herein may be incorporated. As illustrated, architecture 1100 of FIG. 9 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless communications device 100) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of systems and methods for efficient radio resource request processing have been described in connection with various communications devices and computing devices/processors, the underlying concepts can be applied to any communications or computing device, processor, or system capable of implementing the efficient radio resource request processing systems and methods described. The various techniques described herein can be implemented in connection with hardware or software or, where appropriate, with a combination of both. Thus, the methods and apparatuses for efficient radio resource request processing, or certain aspects or portions thereof, can take the form of program code (i.e., instructions) embodied in tangible and/or non-transitory media, such as floppy diskettes, CD-ROMs, hard drives, or any other machine-readable storage medium, wherein, when the program code is loaded into and executed by a machine, such as a computer, the machine becomes an apparatus for efficient radio resource request processing. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for efficient radio resource request processing may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for efficient radio resource request processing. When implemented on a general-purpose processor, the program code combines with the processor to provide a unique apparatus that operates to invoke the functionality of efficient radio resource request processing as described herein. Additionally, any storage techniques used in connection with an efficient radio resource request processing system may invariably be a combination of hardware and software.

While efficient radio resource request processing systems and methods have been described in connection with the various embodiments of the various figures, it is to be understood that other similar embodiments may be used or modifications and additions may be made to the described embodiments for performing the same function of efficient radio resource request processing without deviating therefrom. For example, one skilled in the art will recognize that efficient radio resource request processing as described in the present application may apply to any environment, whether wired or wireless, and may be applied to any number of such devices connected via a communications network and interacting across the network. Therefore, efficient radio resource request processing should not be limited to any single embodiment, but rather should be construed in breadth and scope in accordance with the appended claims.

What is claimed:

1. A method comprising:
   obtaining, by a processor, device data of a wireless communications device, the device data comprising performance data and operating conditions data for a component of the wireless communications device;
   receiving, by the processor, a first request for data access from a first application executing on the wireless communications device;
   accepting, by the processor, the first request based on a determination by the processor that the first request would not interfere with an ongoing feature of the communications device;
   determining, by the processor, based on the device data, to store the first request for data access;
   determining, by the processor, that the first request for data access is eligible to be serviced based on the device data;
   aggregating, by the processor, the stored first request for data access with a stored second request for data access;
   determining, by the processor, based on the operating conditions data, a size threshold;
   determining, by the processor, that an aggregated size of the stored first request for data access comprising a first size and a stored second request for data access comprising a second size exceeds the size threshold;
   determining, by the processor, based on historical traffic pattern data, a first priority for the aggregated first request for data access and the second request for data access;
   determining, by the processor, that a third request for data access comprises a third size, wherein the third size does not exceed the size threshold;
   determining, by the processor, a second priority for the third request for data access;
   determining, by the processor, that the second priority is higher than the first priority; and
   transmitting the third request for data access to a radio access network based on an indication by a proximity sensor of the wireless communication device that the wireless communication device is not currently being used for a voice call.

2. The method of claim 1, further comprising determining that the first priority is a low priority.

3. The method of claim 1, wherein the component comprises a global positioning system (GPS) component.

4. The method of claim 1, wherein the component comprises an accelerometer.

5. A wireless communications device comprising:
   a transceiver;
   a proximity sensor;
   a processor coupled to the transceiver and the proximity sensor; and
   a memory coupled to the processor comprising executable instructions that when executed by the processor cause the processor to effectuate operations comprising:
      obtaining device data, the device data comprising performance data and operating conditions data for a component of the wireless communications device;
      receiving a first request for data access from a first application executing on the wireless communications device;
      accepting the first request based on a determination that the first request would not interfere with an ongoing feature of the communications device;
      determining, based on the device data, to store the first request for data access;
      determining that the first request for data access is eligible to be serviced based on the device data;
      aggregating the stored first request for data access with a stored second request for data access;
      determining, based on the operating conditions data, a size threshold;
      determining that an aggregated size of the stored first request for data access comprising a first size and a stored request for data access comprising a second size exceeds the size threshold;
      determining, based on historical traffic pattern data, a first a first priority for the aggregated first request for data access and the second request for data access;
      determining that a third request for data access is below the size threshold;
      determining a second priority for the third request for data access;
      determining that the second priority is higher than the first priority; and
      providing the third request for data access to the transceiver based on an indication by the proximity sensor that the wireless communication device is not currently being used for a voice call.

6. The wireless communications device of claim 5, wherein the first priority is a low priority.

7. The wireless communications device of claim 5, wherein the aggregated size further comprises a stored fourth request for data access comprising a third size.

8. The wireless communications device of claim 5, wherein the operations further comprise:
   determining a total number of stored requests for data access.

9. The wireless communications device of claim 8, wherein the size threshold is determined based on the total number of stored requests for data access.

10. A system comprising:
    a memory comprising instructions; and
    a processor coupled to the memory that, when executing the instructions, effectuates operations comprising:

obtaining device data for a wireless communications device, the device data comprising at least one of performance data or operating conditions data for a component of the wireless communications device;

receiving a first request for data access from a first application executing on the wireless communications device;

accepting the first request based on a determination that the first request would not interfere with an ongoing feature of the communications device;

determining, based on the device data, to store the first request for data access;

determining that the first request for data access is eligible to be serviced based on the device data;

aggregating the stored first request for data access with a stored second request for data access;

determining, based on the operating conditions data, a size threshold;

determining that an aggregated size of the stored first request for data access comprising a first size and a stored second request for data access comprising a second size exceeds the size threshold;

determining, based on historical traffic pattern data, a first priority for the aggregated first request for data access and the second request for data access;

determining that a third request for data access is within the size threshold;

determining a second priority for the third request for data access; determining that the second priority is lower than the first priority;

transmitting the aggregated request for data access to a radio access network based on an indication by a proximity sensor of the wireless communication device that the wireless communication device is not currently being used for a voice call.

11. The system of claim 10, wherein the first priority is a low priority.

12. The system of claim 10, wherein the operations further comprise:
determining a number of stored requests for data access; and
determining the size threshold based on the number of stored requests for data access.

13. The system of claim 10, wherein the aggregated size further comprises a stored fourth request for data access comprising a fourth size.

14. The system of claim 10, wherein the device data further comprises historical data.

15. The system of claim 10, wherein the operations further comprise:
receiving a fourth request for data access;
determining that the fourth request for data access is not eligible to be serviced based on the device data; and
sending a backoff instruction to a second application executing on the wireless communication device associated with the fourth request for data access.

16. The system of claim 10, wherein the stored second request for data access is associated with the first application.

17. The system of claim 16, wherein the third request for data access is associated with a second application executing on the wireless communication device.

18. The system of claim 10, wherein the operations further comprise:
receiving a fourth request for data access;
denying the fourth request based on a determination that the fourth request would interfere with an ongoing feature of the communications device; and
sending a backoff instruction to a second application executing on the wireless communication device associated with the fourth request for data access.

* * * * *